United States Patent
Hamada et al.

(10) Patent No.: US 8,884,922 B2
(45) Date of Patent: Nov. 11, 2014

(54) DISPLAY DEVICE INCLUDING TOUCH PANEL AND PARALLAX BARRIER SHARING SINGLE BOARD

(75) Inventors: Hiroshi Hamada, Osaka (JP); Akira Imai, Osaka (JP); Tomoo Takatani, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 113 days.

(21) Appl. No.: 13/583,082

(22) PCT Filed: Feb. 16, 2011

(86) PCT No.: PCT/JP2011/053213
§ 371 (c)(1),
(2), (4) Date: Sep. 6, 2012

(87) PCT Pub. No.: WO2011/125373
PCT Pub. Date: Oct. 13, 2011

(65) Prior Publication Data
US 2012/0327005 A1  Dec. 27, 2012

(30) Foreign Application Priority Data
Apr. 1, 2010  (JP) .................................. 2010-085530

(51) Int. Cl.
*G06F 3/045* (2006.01)
*G06F 3/041* (2006.01)
*H04N 13/04* (2006.01)
*G06F 3/044* (2006.01)

(52) U.S. Cl.
CPC .......... *G06F 3/0412* (2013.01); *H04N 13/0413* (2013.01)
USPC ....................................... 345/174; 178/18.06

(58) Field of Classification Search
CPC .................................................... G06F 3/044
USPC ....................................... 345/174; 178/18.06
See application file for complete search history.

(56) References Cited

U.S. PATENT DOCUMENTS

| | | | |
|---|---|---|---|
| 8,643,624 B2 * | 2/2014 | Day et al. | 345/174 |
| 2008/0062139 A1 * | 3/2008 | Hotelling et al. | 345/173 |
| 2009/0185088 A1 * | 7/2009 | Shinohara | 349/12 |
| 2009/0256818 A1 * | 10/2009 | Noguchi et al. | 345/174 |
| 2010/0321621 A1 | 12/2010 | Kikuchi et al. | |

FOREIGN PATENT DOCUMENTS

| | | | | |
|---|---|---|---|---|
| JP | 2004-272354 A | | 9/2004 | |
| KR | 10-082539 B1 * | | 4/2008 | ............ G02F 1/1347 |
| WO | 2009/069358 A1 | | 6/2009 | |

OTHER PUBLICATIONS

Official Communication issued in International Patent Application No. PCT/JP2011/053213, mailed on May 24, 2011.

\* cited by examiner

*Primary Examiner* — Adam J Snyder
(74) *Attorney, Agent, or Firm* — Keating & Bennett, LLP

(57) ABSTRACT

A display device includes a touch panel and displays stereoscopic images with reducing its thickness and weight. The display device includes a liquid crystal display panel 20, a switching liquid crystal panel 30 and a touch panel 50. The switching liquid crystal panel 30 is provided on a display surface side of the display panel 20 and switches a display mode between two-dimensional display and three-dimensional display. The touch panel 50 is provided on the display surface side of the display panel 20. The touch panel 50 and the switching liquid crystal panel 30 commonly include one common board 32 and are configured as one component. A touch panel transparent electrode 51 and a switching liquid crystal panel transparent electrode 33 are provided on the common board 32. The switching liquid crystal panel transparent electrode 33 applies a voltage to liquid crystals of the switching liquid crystal panel 30.

12 Claims, 11 Drawing Sheets

DISPLAY DEVICE INCLUDING TOUCH PANEL AND PARALLAX BARRIER SHARING SINGLE BOARD

TECHNICAL FIELD

The present invention relates to a display device.

BACKGROUND ART

A display device including a display panels such as a liquid crystal panel is used for a portable terminal device such as a mobile phone and PDA or an electronic device such as a computer and a television. A parallax barrier is applied to such a display device to display a stereoscopic image. Using a parallax barrier, each of a left eye and a right eye sees a different image and human beings sense a stereoscopic image due to binocular parallax. Patent Document 1 discloses one example of such a display device having a function of displaying stereoscopic images.

Patent Document 1: Japanese Unexamined Patent Application Publication No. 2004-272354

Problem to be Solved by the Invention

The display device disclosed in Patent Document 1 includes a touch panel, a display panel such as a liquid crystal panel and a layer of switching liquid crystal (parallax barrier). Pixels for a right eye and pixels for a left eye are displayed on the display panel, and an observer can see the pixels for a right eye with his/her right eye and see the pixels for a left eye with his/her left eye through slits formed in the layer of switching liquid crystal. Accordingly, the observer can see stereoscopic image caused by the binocular parallax.

The number of components is increased and a thickness and a weight of a whole device are also increased in the display device that displays stereoscopic images compared to a display device that displays only two-dimensional images. The display device including an input device such as a touch panel is further increased in its thickness and weight.

DISCLOSURE OF THE PRESENT INVENTION

The present invention was accomplished in view of the foregoing circumstances. An object of the present invention is to provide a display device including a touch panel and a function of displaying stereoscopic images with reducing its thickness and weight.

Means for Solving the Problem

To solve the above problem, a display device according to the present invention includes a display panel having a display surface, a touch panel provided on a display surface side of the display panel, and a parallax barrier configured to enable three-dimensional display. At least two of the display panel, the touch panel and the parallax barrier are configured as one component.

According to the present technology, at least two of the display panel, the touch panel and the parallax barrier are configured as one component and this achieves reduction of the display device in its thickness and weight.

To solve the above problem, a display device of the present invention includes a display panel having a display surface, a switching liquid crystal panel provided on a display surface side of the display panel and configured to switch a display mode between a two-dimensional display and a three-dimensional display, a touch panel provided on the display surface side of the display panel, a common board commonly included in the touch panel and the switching liquid crystal panel and configured to form the touch panel and the switching liquid crystal panel as one component, a touch panel transparent electrode arranged on the common board, and a switching liquid crystal transparent electrode arranged on the common board and configured to apply a voltage to liquid crystals in the switching liquid crystal panel.

The touch panel and the switching liquid crystal panel commonly include one common board to configure one component, and this achieves reduction in thickness and weight of the display device.

In the above configuration, the touch panel transparent electrode may include a first touch panel transparent electrode extending in one direction, and a second touch panel transparent electrode extending in another direction crossing the one direction. The switching liquid crystal panel transparent electrode may include a first switching liquid crystal panel transparent electrode extending in the one direction, and a second switching liquid crystal panel transparent electrode extending in the other direction. The first touch panel transparent electrode and the first switching liquid crystal panel transparent electrode may be configured with a common electrode that is provided on the display panel side of the common board.

Thus, the first touch panel transparent electrode and the first switching liquid crystal panel transparent electrode are configured with one common electrode, and this achieves reduction in thickness and weight of the device.

The second touch panel transparent electrode may be provided on a side of the common board opposite to the display panel and the common electrode.

The touch panel transparent electrode may be provided on a side of the common board opposite to the display panel, and the switching liquid crystal panel transparent electrode may be provided on the display side of the common board.

An example of the display panel is a liquid crystal panel using liquid crystals. Such a display device is applied to various uses such as a mobile phone, a smart phone, a portable game machine, a notebook computer, a desktop of a personal computer as a liquid crystal display device, and especially appropriate for a display screen of various sizes.

Advantageous Effect of the Invention

The present invention provides a display device including a touch panel and displaying stereoscopic images with reducing its thickness and weight.

MODE FOR CARRYING OUT THE INVENTION

First Embodiment

Figure 1:
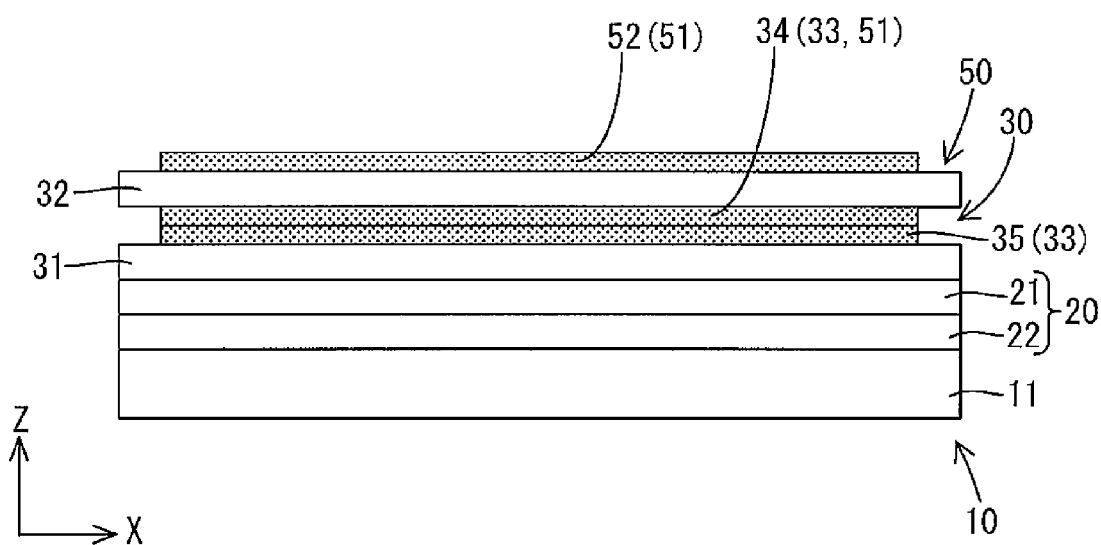
FIG. 1 is a cross-sectional view illustrating a general construction of a display device according to a first embodiment of the present invention.

A first embodiment of the present invention will be explained with reference to FIG. 1 to FIG. 4. In the present embodiment, a liquid crystal display device 10 (display device) will be described as an example. The liquid crystal display device 10 is used as an information display element included in various electronic devices such as a portable information terminal, a mobile phone, a notebook computer, a portable game machine (not illustrated). An X-axis, a Y-axis and a Z-axis are described in a part of some drawings. A long-side of the liquid crystal display device 10 corresponds to the X-axis and a short-side thereof corresponds to the Y-axis. The up-down direction in FIG. 1 corresponds to the Z-axis (a front-rear direction, a direction vertical to a screen), and an upper side in FIG. 1 is a front-surface side and a lower side in FIG. 1 is a rear-surface side.

The liquid crystal display device 10 has a landscape quadrangular shape (rectangular shape) as a whole. As illustrated in FIG. 1, the liquid crystal display device 10 includes a backlight device 11, a liquid crystal panel 20 (a display panel), a switching crystal liquid panel 30 (a binocular parallax) and a touch panel 50. The liquid crystal panel 20, the switching liquid crystal panel 30 and the touch panel 50 are laminated on the backlight device 11 in this order. The touch panel 50 and the switching liquid crystal panel 30 are provided on a display surface side of the liquid crystal display panel 20. The liquid crystal display panel 20, the switching liquid crystal panel 30 and the touch panel 50 are electrically connected to a control circuit board (not illustrated) via a flexible board (not illustrated), for example.

The backlight device 11 includes a chassis and light sources (for example, cold cathode tubes or LEDs (not illustrated)). The chassis is formed in substantially a box shape having an opening that is open to a front-surface side (a liquid crystal display panel 20 side) and the light sources are housed in the chassis. The backlight device 11 exits light toward the liquid crystal display panel 20. The backlight device 11 includes an optical member (not illustrated) that is arranged to cover the opening of the chassis. The optical member converts light emitted from the light sources to planar light.

The liquid crystal display panel 20 includes a pair of transparent (transmissive) glass substrates 21, 22 and a liquid crystal layer (not illustrated) containing liquid crystal molecules that changes its optical property according to impressing of an electric field. The liquid crystal layer is provided between the pair of transparent glass substrates 21, 22. The transparent glass substrates 21, 22 are bonded together with a sealing agent with ensuring a gap corresponding to a thickness of the liquid crystal layer.

The transparent glass substrate 21 that is provided on a front-surface side (au upper side in FIG. 1) is a CF board 21 and the transparent glass substrate 22 that is provided on a rear-surface side is a TFT board 22 (an element board). A plurality of TFTs (thin film transistor) and pixel electrodes are arranged on an inner surface (a surface close to the liquid crystal layer, a surface facing the CF board 21) of the TFT board 22 (not illustrated). The TFT is a switching component that drives liquid crystals for every pixel. Source lines and gate lines that are arranged in a grid pattern are provided to surround each of the TFTs and the pixel electrodes. The gate lined and the source lines are connected to gate electrodes and source electrodes of the TFTs, respectively, and the pixel electrodes are drain electrodes of the TFTs. Each of the pixel electrodes is a transparent electrode formed of ITO (Indium Tin Oxide) or IZO (Indium Zinc Oxide) and the like.

Figure 5:
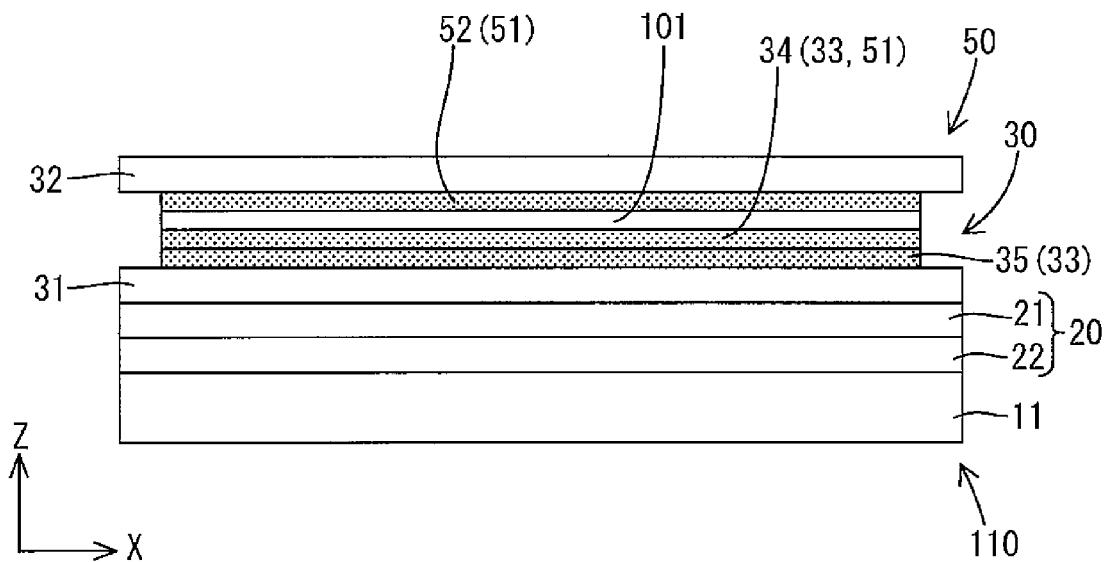
FIG. 5 is a cross-sectional view illustrating a general construction of a display device according to a second embodiment of the present invention.

Color filters having color sections such as R (red), G (green) and B (blue) color sections arranged corresponding to each pixel are provided on the CF board 21. A light blocking layer (a black matrix) is formed between the color sections of the color filter to prevent decrease in a contrast ratio that is caused due to leaking of light. Counter electrodes are provided on surfaces of the color filter and the light blocking layer so as to face the pixel electrodes on the TFT board 22. As illustrated in FIG. 5, the counter electrodes are electrically connected to the TFT board via a conductive material (such as a carbon paste having conductivity). An alignment film is provided on an inner surface of each of the boards 21, 22 to arrange an alignment of liquid crystal molecules contained in the liquid crystal layer. A polarizing plate (not illustrated) is provided on an outer surface of each board 21, 22.

The switching liquid crystal panel 30 and the touch panel 50 are integrally provided on a front surface side (an upper side in FIG. 1) of the liquid crystal display panel 20.

The switching liquid crystal panel 30 is arranged in adjacent to the liquid crystal display panel 20 and capable of switching a display mode between a two-dimensional display mode and a three-dimensional display mode. The switching liquid crystal panel 30 includes a transparent (light transmissive) glass substrates 31, 32, a liquid crystal layer (not illustrated) that is provided between the boards 31, 32, and a polarizing plate provided on an outer surface of the liquid crystal layer. The glass substrate 32 that is provided away from the liquid crystal display panel 20 configures a part of the touch panel 50 and is used commonly for the switching liquid crystal panel 30 and the touch panel 50. Therefore, the glass substrate 32 may be referred to as a common board 32.

The switching liquid crystal panel 30 includes a switching liquid crystal panel transparent electrode 33 that applies voltage to the liquid crystal layer arranged between the boards 31 and 32. In this embodiment, the transparent electrode 33 includes two kinds of a first liquid crystal panel transparent electrode 34 and a second liquid crystal panel transparent electrode 35 each of which extends in a different direction.

Figure 2:
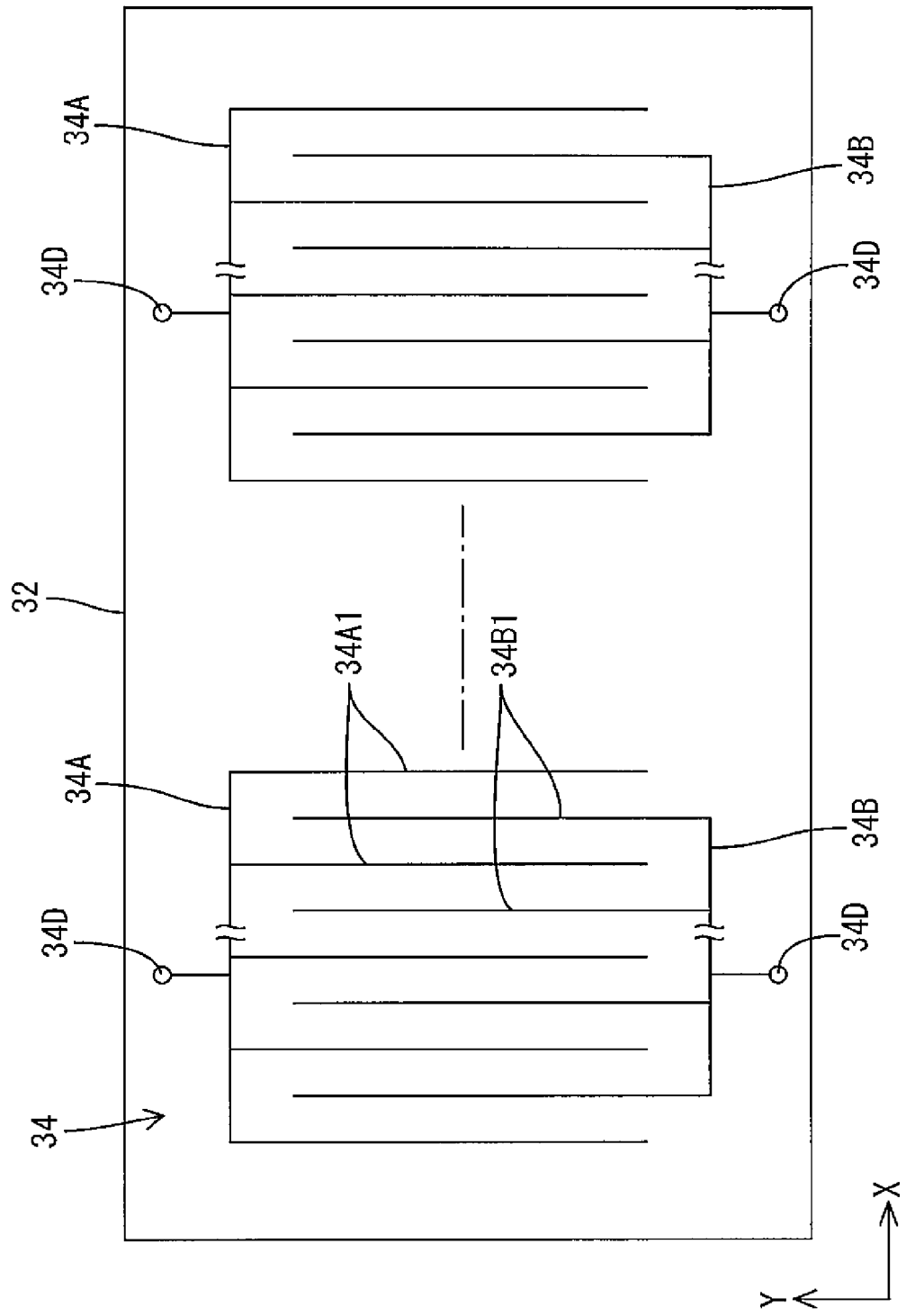
FIG. 2 is a plan view typically illustrating a common electrode included in the display device of FIG. 1.

The first transparent electrode 34 that is provided close to the touch panel 50 extends in the Y-axis direction (along one side of the liquid crystal display device 10), as illustrated in FIG. 2. Specifically, the first transparent electrode 34 includes a plurality pairs of comb-shaped electrodes 34A, 34B that are arranged in the X-axis direction. In one pair of the electrodes 34A, 34B, an extending portion 34B1 (extending in the Y-axis direction) of the electrode 34B is provided between extending portions 34A1 (extending in the Y-axis direction) of the electrode 34A. The first switching liquid crystal panel transparent electrode 34 configures a part of a transparent electrode of the touch panel 50. The first transparent electrode 34 is used commonly for the switching liquid crystal panel 30 and the touch panel 50 and may be referred to as a common electrode 34.

Figure 3:
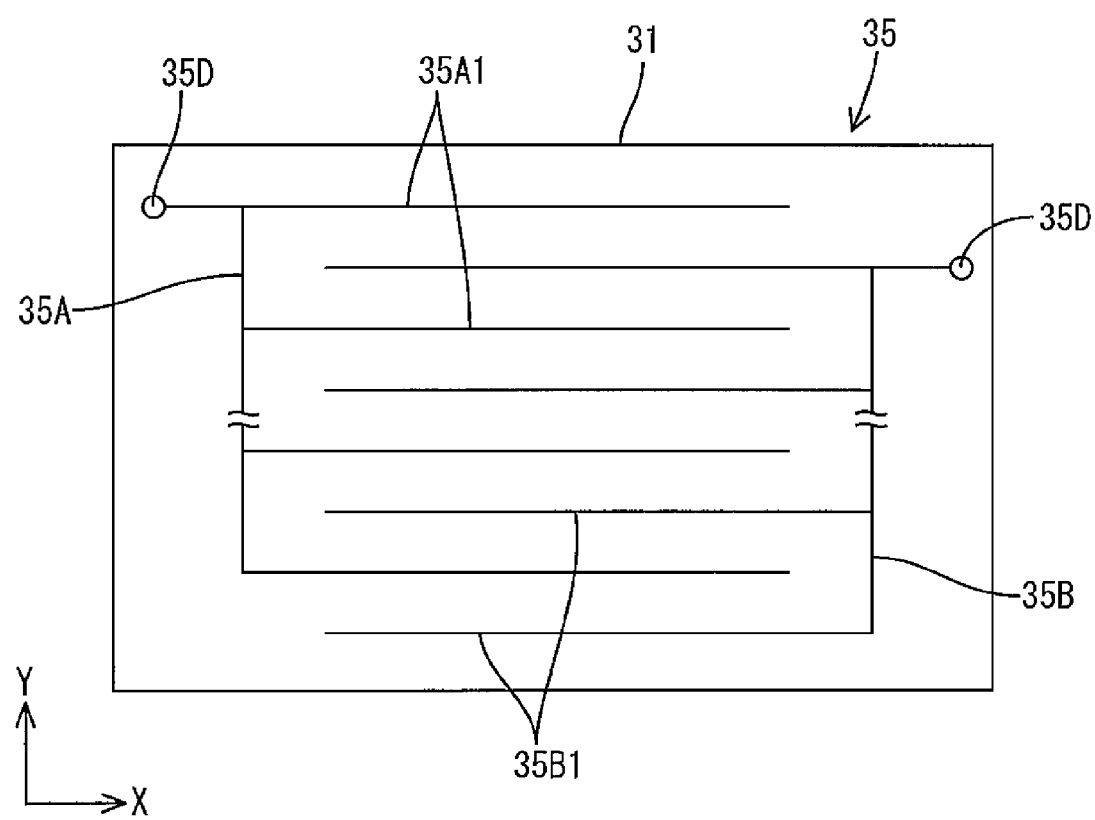
FIG. 3 is a plan view typically illustrating a transparent electrode for a second switching liquid crystal panel included in the display device of FIG. 1.

As illustrated in FIG. 3, the second switching liquid crystal panel transparent electrode 35 that is provided close to the liquid crystal display panel 20 extends in the X-axis direction. Specifically, the second transparent electrode 35 includes a plurality pairs of comb-shaped electrodes 35A, 35B that are arranged in the X-axis direction. In one pair of the electrodes 35A, 35B, an extending portion 35B1 (extending in the X-axis direction) of the electrode 35B is provided between extending portions 35A1 (extending in the X-axis direction) of the electrode 35A. A part of the pair of electrodes 35A, 35B is illustrated in FIG. 3.

A voltage is applied to one of the electrodes 34A and 34B included in the first transparent electrode 34, for example, the electrode 34A, and the electrode 34B and the second switching liquid crystal panel transparent electrodes 35A, 35B are grounded. Then, light (that is exited from the backlight device 11 and transmitted through the liquid crystal display panel 20) is transmitted only through the portions of the switching liquid crystal panel 30 corresponding to the extending portions 34A1 of the electrode 34A. Accordingly, in the liquid crystal display panel 20, one group of pixels can be seen by a right eye and another group of pixels can be seen by a left eye. The switching liquid crystal panel 30 functions as a parallax barrier and this enables three-dimensional display.

A voltage is applied to one of the electrodes 35A, 35B of the switching liquid crystal display panel transparent electrode 35, for example, the electrode 35A, and the electrode 35B and the first the switching liquid crystal panel transparent electrodes 34A, 34B are grounded. Then, the light (that is exited from the backlight device 11 and transmitted through the liquid crystal display panel 20) is transmitted only through the portions of the switching liquid crystal panel 30 corresponding to the extending portions 35A1 of the electrode 35A. Accordingly, in the liquid crystal display panel 20, one group of pixels can be seen by a right eye and another group of pixels can be seen by a left eye. The switching liquid crystal panel 30 functions as a parallax barrier and this enables three-dimensional display.

In the present embodiment, the liquid crystal display device 10 includes two types of the first switching liquid crystal panel transparent electrode 34 and the second switching liquid crystal panel transparent electrode 35 that extend in different directions. Therefore, a parallax barrier is created in the long-side direction and the short-side direction of the liquid crystal display device 10, and the three-dimensional display is enabled in both cases in which the display device 10 is in a vertical position and in a horizontal position. Specifically, if a voltage is applied to the electrodes 34A, 35A, 35B, the three-dimensional display is enabled in a condition that the display device 10 is positioned with the Y-axis direction matching a vertical direction. If a voltage is applied to the electrodes 35A, 34A, 34B, the three-dimensional display is enabled in a condition that the display device 10 is positioned with the X-axis direction matching a vertical direction.

Pixels for a right eye and pixels for a left eye are displayed on the liquid crystal display panel. A user of the liquid crystal display device 10 can see the right eye pixels with his/her right eye and see the left eye pixels with his/her left eye via the light transmission portions formed on the switching liquid crystal panel 30. If a voltage is applied to the first transparent electrode 34 and the second transparent electrode 35, the light transmission portions are formed on an almost entire area of the switching liquid crystal display panel 30, and this enables the two-dimensional display. In the present embodiment, if no voltage is applied to the electrodes, a normally black mode in which light is not transmitted through the switching liquid crystal panel is used as a mode for the switching liquid crystal display panel. However, if no voltage is applied to the electrodes, a normally white mode in which light is transmitted through the switching liquid crystal panel may be used.

Figure 10:
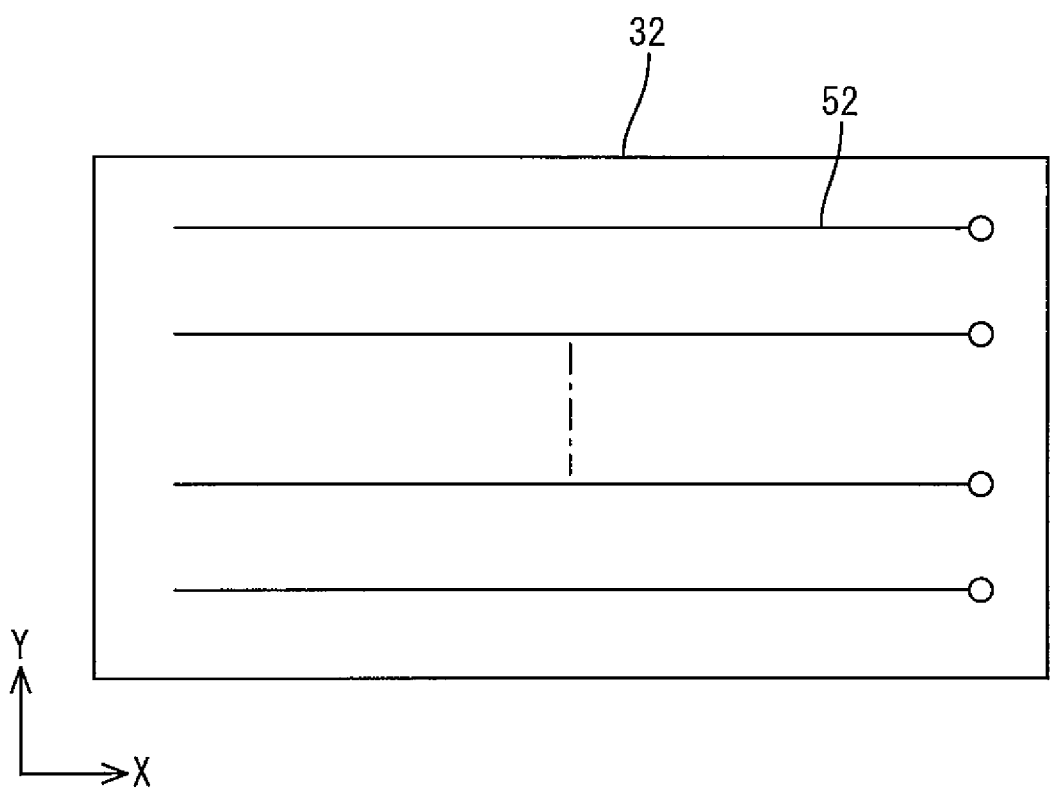
FIG. 10 is a plan view typically illustrating an electrode for a second touch panel.

The touch panel 50 includes the common board 32 and touch panel transparent electrodes 51 each of which is provided on a front surface and a rear surface of the common board 32. Specifically, the transparent electrode 51 includes the common electrode 34 (first touch panel transparent electrode) extending in the Y-axis direction and a second touch panel transparent electrode 52 (see FIG. 10) extending in the X-axis direction (a direction perpendicular to the first touch panel transparent electrode). The second touch panel transparent electrode 52 is provided on a front surface side of the common board 32 and the common electrode 34 is provided on a rear side surface of the common board 32. The second touch panel transparent electrode 52 is provided on a side of the common board 32 that is opposite to the liquid crystal display panel 20 and the common electrode 32.

Data (for example, coordinate data on the touch panel 50) is input via the touch panel 50 according to change in electrostatic capacity between the common electrode 34 and the second touch panel transparent electrode 52 that is generated by touching of the surface of the touch panel 50 with a finger. The touch panel 50 of the present embodiment is a touch panel of a mutual capacitance sensing method. For example, if a pulse voltage is sequentially applied to the first touch panel transparent electrode 34 (for example, the common electrodes 34A and 34B form a set of electrodes), charge induced to the other electrode (the second touch panel transparent electrode 52) is measured to detect change in the electrostatic capacity.

In the present embodiment, the common board 32 is used commonly in the touch panel 50 and the switching liquid crystal panel 30. Both of the touch panel 50 and the switching liquid crystal panel 30 require a transparent electrode extending in the Y-axis direction. Accordingly, the transparent electrode (the common electrode 34) extending in the Y-axis direction is commonly used for the both panels 30, 50.

In the common electrode 34 of the present embodiment, an interval between the adjacent extending portions 34A1 (that is a minimum interval between a light blocking barrier formed on the switching liquid crystal panel 30) is set to be 20 μm. If the electrode is used as the transparent electrode for the touch panel 50, for example, twenty five extending portions 34A1 are used as one set for the electrode. Resolution of the touch panel 50 in the X-axis direction is set to be 5 mm. The number of the extending portions 34A1 included in one set may be altered if necessary, and an interval between the extending portions 34A1 may be altered if necessary.

Figure 4A:
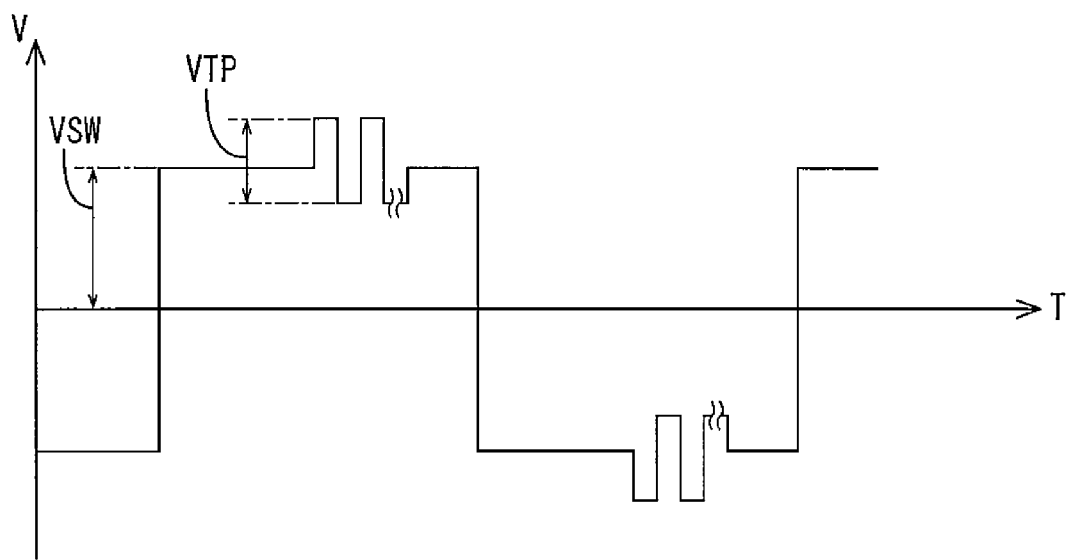
FIG. 4A is a view illustrating a waveform of a pulse signal that is applied to the common electrode.
Figure 4B:
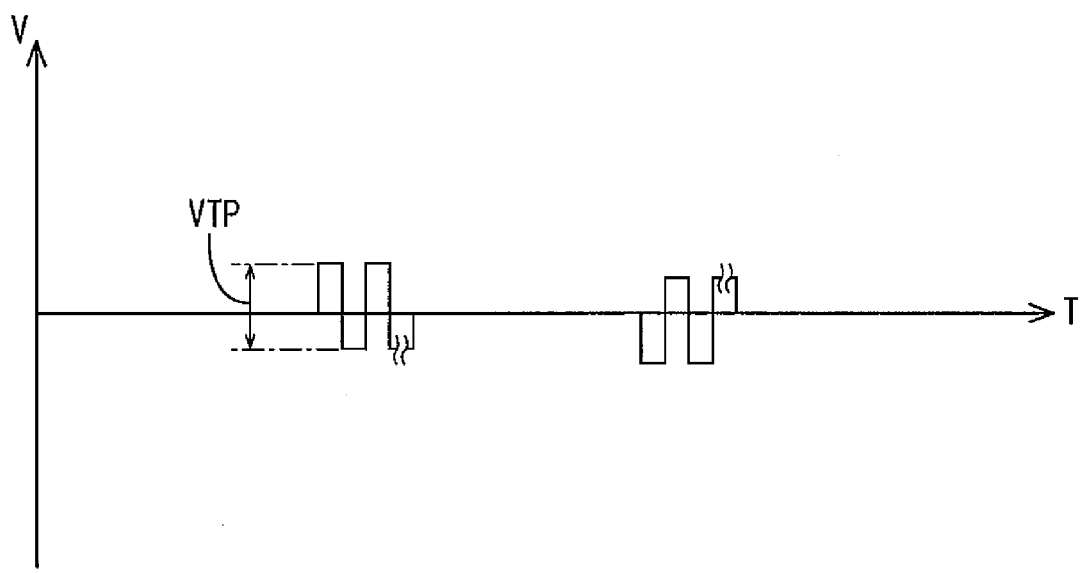
FIG. 4B is a view illustrating a waveform of a pulse signal that is applied to the common electrode.

FIGS. 4A and 4B illustrate a waveform of a pulse signal for driving the touch panel 50 that is applied to the common electrode 34 and a waveform of a pulse signal for driving the switching liquid crystal display panel 30. In FIGS. 4A and 4B, a horizontal axis refers to time and a vertical axis refers to a voltage. FIG. 4A illustrates a voltage applied to the electrode 34A and FIG. 4B illustrates a voltage applied to the electrode 34B. As illustrated in FIG. 4, frequency of the pulse signal VSW for driving the touch panel 50 (for example, a few tens to a few hundreds KHz) is set to be sufficiently higher than frequency of the pulse signal VTF for driving the switching liquid crystal panel 30 (for example, 60 Hz). Therefore, the common electrode 34 is commonly used and the driving voltage for driving the touch panel 50 and the driving voltage for driving the switching liquid crystal panel 30 do not affect driving of the touch panel 50 and the switching liquid crystal panel 30 each other.

The voltage of the pulse signal VTP for driving the switching liquid crystal panel 30 (for example, 5V) is set to be higher than the voltage of the pulse signal VSW for driving the touch panel 50 (for example, 3V). This also prevents that the driving of the touch panel 50 does not affect the driving of the switching liquid crystal panel 30.

As explained before, the liquid crystal display device 10 of the present embodiment includes the liquid crystal display panel 20, the touch panel 50 provided on the display surface side of the liquid crystal display panel 20 and the switching liquid crystal panel 30 that enables the three-dimensional display. The touch panel 50 and the switching liquid crystal panel 30 commonly use the common board 32 to be provided as one component. The touch panel transparent electrode 51 and the switching liquid crystal panel transparent electrode (the common electrode 34) are provided on the common board 32. The switching liquid crystal panel transparent electrode applies a voltage to the liquid crystals of the switching liquid crystal panel 30.

Thus, the touch panel 50 and the switching liquid crystal panel 30 are configured as one component and this reduces thickness and weight of the display device.

The touch panel transparent electrode 51 includes the first touch panel transparent electrode extending in the Y-axis direction and the second touch panel transparent electrode 52 extending in the X-axis direction. The switching liquid crystal panel transparent electrode 33 includes the first switching liquid crystal panel transparent electrode and the second switching liquid crystal panel transparent electrode 35. The first switching liquid crystal panel transparent electrode extends in a direction same as in the direction in which the first touch panel transparent electrode extends and the second switching liquid crystal panel 35 extends in a direction same as in the direction in which the second touch panel transparent electrode 52 extends. The first touch panel transparent electrode and the first switching liquid crystal panel transparent electrode are configured with the common electrode 34 that is one electrode provided on a liquid crystal display panel 20 side of the common board 32.

Thus, the first touch panel transparent electrode and the first switching liquid crystal panel transparent electrode are configured with one common electrode 34. This reduces the liquid crystal display device 10 in its thickness and weight.

Second Embodiment

A second embodiment of the present invention will be explained with reference to FIG. 5. A liquid crystal display device 110 of the second embodiment includes the second touch panel transparent electrode 52 that is provided in a different portion from the first embodiment. In the second embodiment, the second touch panel transparent electrode 52 is provided on a side of the common board 32 close to the liquid crystal display panel 20. Specifically, the second touch panel transparent electrode 52 is provided between the common electrode 34 and the common board 32. An insulating layer 101 is provided between the common electrode 34 and the second touch panel transparent electrode 52.

With such a configuration, the touch panel 50 and the switching liquid crystal panel 30 are configured as one component and this reduces the liquid crystal display device 110 in its thickness and weight.

Third Embodiment

Figure 6:
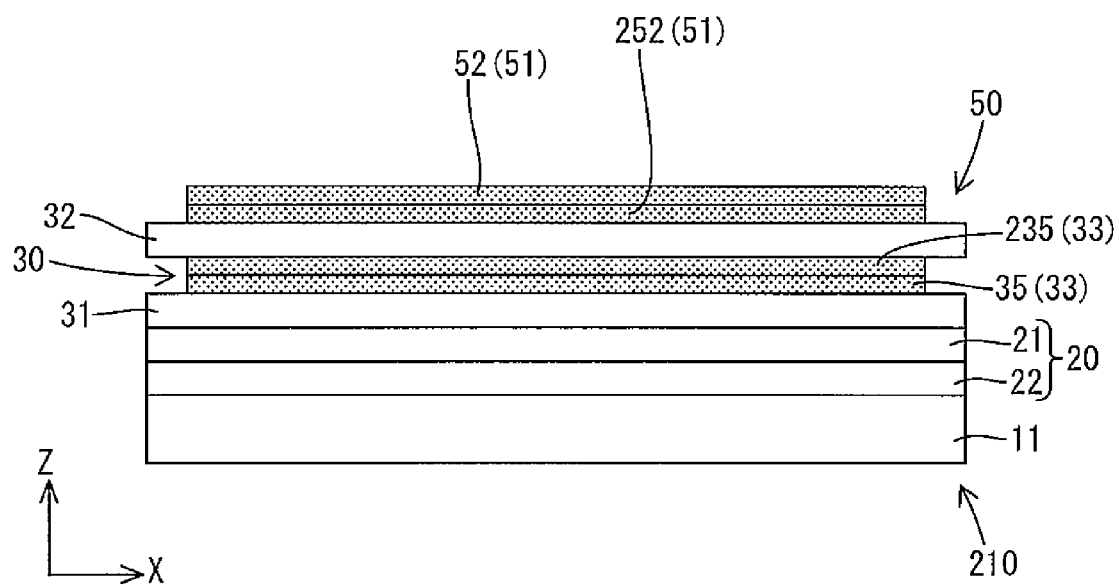
FIG. 6 is a cross-sectional view illustrating a general construction of a display device according to a third embodiment of the present invention.

Next, a third embodiment of the present invention will be explained with reference to FIG. 6. A liquid crystal display device 210 of the third embodiment does not include the common electrode 34 and includes a first touch panel transparent electrode 252 and a first switching liquid crystal transparent electrode 235 as a separate component. The touch panel transparent electrode 51 is provided on a side (front surface side) of the common board 32 opposite to the liquid crystal display panel 20, and the switching liquid crystal panel transparent electrode 33 is provided on the liquid crystal display panel side of the common board 32.

With such a configuration, the touch panel 50 and the switching liquid crystal panel 30 commonly use the common board 32 and are configured as one component. This reduces the liquid crystal display device 210 in its thickness and weight.

Fourth Embodiment

Figure 7:
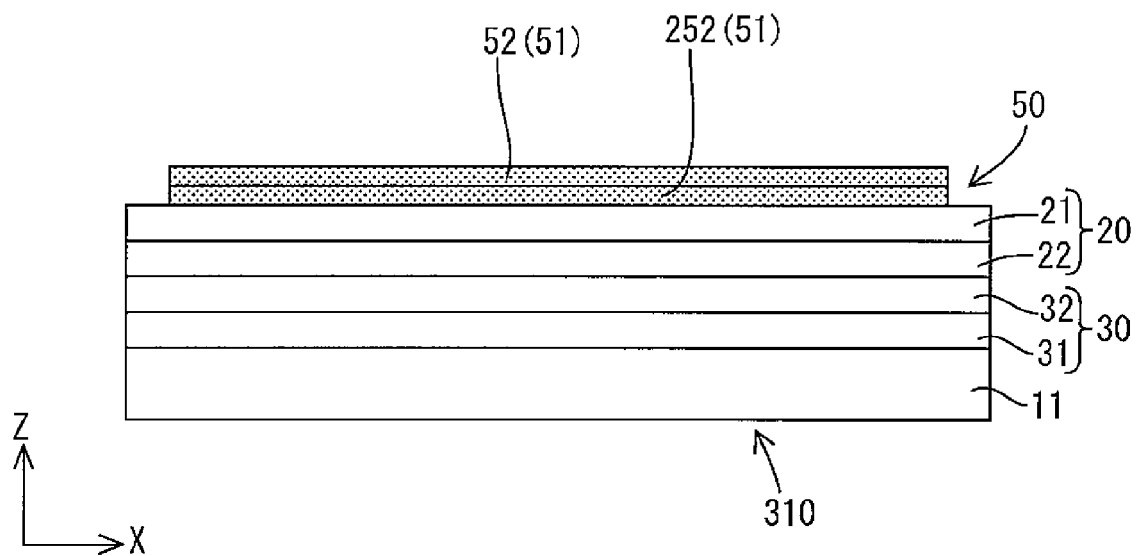
FIG. 7 is a cross-sectional view illustrating a general construction of a display device according to a fourth embodiment of the present invention.

Next, a fourth embodiment of the present invention will be explained with reference to FIG. 7. In the fourth embodiment, a liquid crystal display device 310 includes the switching liquid crystal panel 30, the liquid crystal panel 20 and the touch panel 50 that are laminated from the backlight device 11 in this order. In the fourth embodiment, the touch panel 50 and the liquid crystal display panel 20 uses the common board (the CF board 21) and are configured as one component. Such a configuration reduces the liquid crystal display device 310 in its thickness and weight.

Other Embodiments

The present invention is not limited to the above embodiments described in the above description and the drawings. The following embodiments are also included in the technical scope of the present invention, for example.

(1) In the above embodiments, the touch panel 50 of a mutual capacitance sensing method is used. However, a position detection method of the touch panel 50 is not limited thereto. For example, as a position detection method of the touch panel 50, the electrostatic capacity of a sensor electrode of the touch panel 50 may be directly measured (self capacity detecting method). A shape of the touch panel transparent electrode of the touch panel 50 is not limited to the shape as described in the above embodiments (the transparent electrode extending in the X-axis direction and that extending in the Y-axis direction are overlapped with each other in a grid). For example, in the third embodiment including no common electrode 34, the transparent electrodes may be provided so as to be in a diamond pattern.

Figure 8:
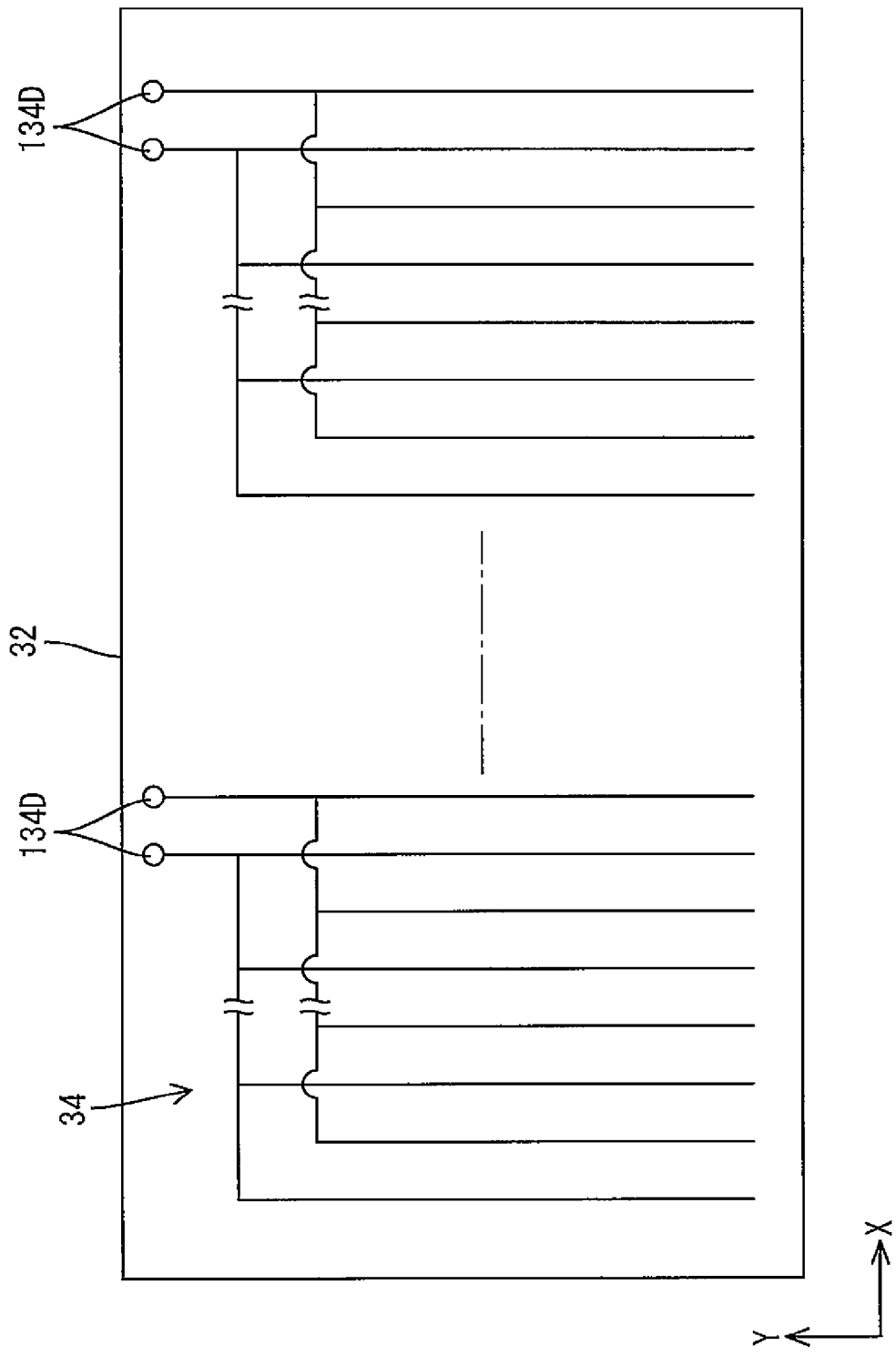
FIG. 8 is a plan view typically illustrating a common electrode according to another embodiment.
Figure 9:
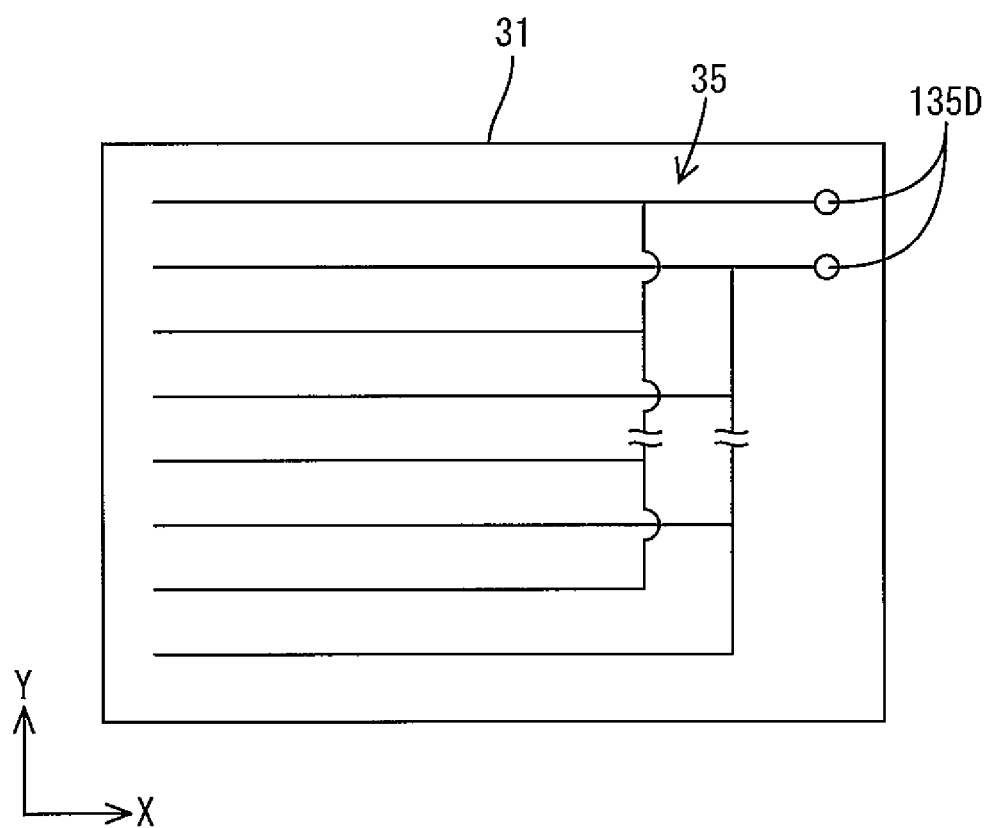
FIG. 9 is a plan view typically illustrating a transparent electrode for a second switching liquid crystal panel according to another embodiment.

(2) Positions of terminal portions (34D, 35D) of the common electrode 34 and the switching liquid crystal panel transparent electrode 35 to which a power source is connected are not limited to those in the above embodiments. The direction in which the terminal portions (34D, 35D) extend from the transparent electrode is not limited to the one described in the above embodiments. They may be altered if necessary. As illustrated in FIGS. 8 and 9, terminal portions 134D (or 135D) may be provided on one side on the board to form the electrodes 34, 35.

(3) In the above embodiments, on the touch panel and the switching liquid crystal panel, the transparent electrode extending in the X-axis direction is the common electrode 34. However, it is not limited thereto. For example, on the touch panel and the switching liquid crystal panel, the transparent electrode extending in the Y-axis direction may be a common electrode.

(4) The second touch panel transparent electrode 34 and the common electrode 34 are configured to cross at a right angle.

However, it is not limited thereto. For example, the second touch panel transparent electrode 52 and the common electrode 34 may be configured to cross at any angle.

(5) The second touch panel transparent electrode 52 and the second switching liquid crystal panel transparent electrode 35 extend in the same direction (the X-axis direction). However, it is not limited thereto. The transparent electrodes 52, 35 may extend in different directions.

(6) In the above embodiments, the liquid crystal display device uses the liquid crystal panel as a display panel. However, the present technology is applicable to a display device using other type of display panel.

(7) In the above embodiments, TFTs are used as switching components of the liquid crystal display device. However, the technology described above can be applied to liquid crystal display devices including switching components other than TFTs (e.g., thin film diode (TFD)). Moreover, the technology can be applied to not only color liquid crystal display devices but also black-and-white liquid crystal display devices.

EXPLANATION OF SYMBOLS 10, 110, 210, 310: liquid crystal display device (display device), 20: liquid crystal panel (display panel), 30: switching liquid crystal panel (parallax barrier), 32: common board, 33: switching liquid crystal panel transparent electrode, 34: common electrode (first touch panel transparent electrode, first switching liquid crystal panel transparent electrode), 35: second switching liquid crystal panel transparent electrode, 50: touch panel, 51: touch panel transparent electrode, 52: second touch panel transparent electrode

The invention claimed is:

1. A display device comprising:
a display panel having a display surface;
a mutual capacitance sensing touch panel provided on a display surface side of the display panel; and
a parallax barrier configured to enable three-dimensional display, wherein:
the touch panel and the parallax barrier commonly share a single board as a common component;
the single board includes at least one pair of electrodes which are electrically separated from each other, wherein each of the at least one pair of electrodes is a comb-shaped electrode; and
the at least one pair of electrodes are configured to operate both of the touch panel and the parallax barrier.

2. The display device according to claim 1, wherein the display panel is a liquid crystal display panel using liquid crystals.

3. The display device according to claim 1, wherein:
a pulse signal configured to drive the touch panel is supplied to the at least one pair of electrodes,
a pulse signal configured to drive the parallax barrier is also supplied to the at least one pair of electrodes, and
a frequency of the pulse signal configured to drive the touch panel is higher than a frequency of the pulse signal configured to drive the parallax barrier.

4. The display device according to claim 1, wherein:
a pulse signal configured to drive the touch panel is supplied to the at least one pair of electrodes,
a pulse signal configured to drive the parallax barrier is also supplied to the at least one pair of electrodes, and
a voltage of the pulse signal configured to drive the parallax barrier is higher than a voltage of the pulse signal configured to drive the touch panel.

5. A display device comprising:
a display panel having a display surface;
a switching liquid crystal panel provided on a display surface side of the display panel and configured to switch a display mode between a two-dimensional display and a three-dimensional display;
a capacitance sensing touch panel provided on the display surface side of the display panel;
a single board commonly included in both the touch panel and the switching liquid crystal panel and configured to be shared by the touch panel and the switching liquid crystal panel as a common component;
a touch panel transparent electrode arranged on the single board; and
a switching liquid crystal panel transparent electrode arranged on the single board and configured to apply a voltage to liquid crystals in the switching liquid crystal panel; wherein
the switching liquid crystal panel transparent electrode includes a first pair of switching liquid crystal panel transparent electrodes which are electrically separated from each other, wherein each of the first pair of switching liquid crystal panel transparent electrodes is a comb-shaped electrode.

6. The display device according to claim 5, wherein the touch panel transparent electrode is provided on the single board at a side opposite to the display panel with respect to the first pair of switching liquid crystal panel transparent electrodes.

7. The display device according to claim 5, wherein:
the touch panel transparent electrode is provided on a side of the single board opposite to the display panel; and
the first pair of switching liquid crystal panel transparent electrodes are provided on a side of the single board facing the display panel.

8. The display device according to claim 5, wherein:
a pulse signal configured to drive the touch panel is supplied to the touch panel transparent electrode,
a pulse signal configured to drive the switching liquid crystal panel is supplied to the first pair of switching liquid crystal panel transparent electrodes, and
a frequency of the pulse signal configured to drive the touch panel is higher than a frequency of the pulse signal configured to drive the switching liquid crystal panel.

9. The display device according to claim 5, wherein:
a pulse signal configured to drive the touch panel is supplied to the touch panel transparent electrode,
a pulse signal configured to drive the switching liquid crystal panel is supplied to the first pair of switching liquid crystal panel transparent electrodes, and
a voltage of the pulse signal configured to drive the switching liquid crystal panel is higher than a frequency of the pulse signal configured to drive the touch panel.

10. The display device according to claim 5, further comprising:
a second pair of switching liquid crystal panel transparent electrodes, wherein
the first pair of switching liquid crystal panel transparent electrodes and the second pair of switching liquid crystal panel transparent electrodes are positioned to sandwich the liquid crystals in the switching liquid crystal panel therebetween,
each of the first pair of switching liquid crystal panel transparent electrodes includes a plurality of first parallel portions which extend in a first direction, and each of the second pair of switching liquid crystal panel transparent electrodes includes a plurality of second parallel portions which extend in a second direction which crosses the first direction.

11. The display device according to claim 10, wherein each of the second pair of switching liquid crystal panel transparent electrodes is a comb-shaped electrode.

12. The display device according to claim 5, wherein the touch panel is a mutual capacitance sensing touch panel.

* * * * *